(12) United States Patent
Wu et al.

(10) Patent No.: US 11,054,526 B2
(45) Date of Patent: Jul. 6, 2021

(54) SATELLITE POSITIONING MODULE AND SATELLITE POSITIONING METHOD

(71) Applicant: Industrial Technology Research Institute, Hsinchu (TW)

(72) Inventors: Jiun-Ming Wu, Hsinchu (TW); Cheng-Yun Ho, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 435 days.

(21) Appl. No.: 16/233,995

(22) Filed: Dec. 27, 2018

(65) Prior Publication Data

US 2020/0191976 A1 Jun. 18, 2020

(30) Foreign Application Priority Data

Dec. 17, 2018 (TW) .................................. 107145518

(51) Int. Cl.
*G01S 19/28* (2010.01)
*G01S 19/22* (2010.01)
*G01S 19/37* (2010.01)

(52) U.S. Cl.
CPC .............. *G01S 19/28* (2013.01); *G01S 19/22* (2013.01); *G01S 19/37* (2013.01)

(58) Field of Classification Search
CPC ........... G01S 19/22; G01S 19/28; G01S 19/37
See application file for complete search history.

(56) References Cited

U.S. PATENT DOCUMENTS

| 6,366,854 B1* | 4/2002 | Tsuchiya ................. G01S 19/37 342/357.27 |
| 7,982,667 B2 | 7/2011 | Vollath et al. |
| 8,346,162 B1 | 1/2013 | Jayasimha et al. |

(Continued)

FOREIGN PATENT DOCUMENTS

| CN | 103809189 A | 5/2014 |
| CN | 104931981 A | 9/2015 |

(Continued)

OTHER PUBLICATIONS

G.L. Squires, Practical Physics, Cambridge University Press, p. 20, 1985 (Year: 1985).*

(Continued)

*Primary Examiner* — Bernarr E Gregory
*Assistant Examiner* — Fred H Mull
(74) *Attorney, Agent, or Firm* — Mintz Levin Cohn Ferris Glovsky and Popeo, P.C.; Peter F. Corless; Steven M. Jensen

(57) ABSTRACT

A satellite positioning module is provided, including: a receiver configured for receiving satellite signals from a plurality of satellites; and a processor connected to the receiver and configured for: performing an operation based on the satellite signals to obtain an elevation angle standard deviation; performing an operation based on the elevation angle standard deviation to obtain an elevation angle mask value; selecting a satellite signal of a satellite that has an elevation angle greater than the elevation angle mask value based on the satellite signals of the satellites to perform a positioning algorithm; and performing the positioning algorithm to obtain position information. A satellite positioning method is also provided.

19 Claims, 6 Drawing Sheets

(56) References Cited

U.S. PATENT DOCUMENTS

| | | | |
|---|---|---|---|
| 8,760,343 B2 | 6/2014 | Milyutin et al. | |
| 9,891,325 B2 | 2/2018 | Milyutin et al. | |
| 9,989,647 B2 | 6/2018 | Kim et al. | |
| 2011/0090117 A1* | 4/2011 | Rodriguez | G01S 19/22 342/357.61 |
| 2012/0319898 A1* | 12/2012 | Tominaga | G01S 19/22 342/357.61 |
| 2015/0319729 A1* | 11/2015 | MacGougan | G01S 19/28 455/456.1 |
| 2017/0067999 A1* | 3/2017 | Chhokra | G01S 19/22 |
| 2020/0292716 A1* | 9/2020 | Aoyama | G01S 19/28 |

FOREIGN PATENT DOCUMENTS

| | | |
|---|---|---|
| CN | 108828627 A | 11/2018 |
| TW | I292829 B | 1/2008 |

OTHER PUBLICATIONS

English translation of CN103809189A (Year: 2021).*
English translation of CN104931981A (Year: 2021).*
English translation of CN108828627A (Year: 2021).*
NPL—English translation of TWI292829B (Year: 2021).*
Deep et al., "GPS SNR prediction in urban environment," The Egyptian Journal of Remote Sensing and Space Science, vol. 21, pp. 83-85 (Apr. 2018).
Pirti, "Multipath and multipath reduction in the obstructed areas by using enhanced strobe correlator (ESC) Technique," Technical Gazette 22(2), pp. 509-519 (2015).
Bilich et al.,"Modeling GPS phase multipath with SNR: Case study from the Salar de Uyuni, Boliva," Journal of Geophysical Research, vol. 113, pp. 1-12 (2008).
Dyukov, "Mask Angle Effects on GNSS Speed Validity in Multipath and Tree Foliage Environments," Asian Journal of Applied Sciences, vol. 4, issue 2, pp. 309-321 (2016).
Spanik et al.,"Multipath detection with the combination of SNR measurements—Example from urban environment," Geodesy and Cartography, vol. 66, No. 2, pp. 305-316 (2017).
Heng et al., "GNSS Multipath & Jamming Mitigation Using High Mask Angle Antennas and Multiple Constellations," IEEE Transactions on Intelligent Transportation Systems, vol. 16, No. 2, pp. 741-750 (2015).

* cited by examiner

SATELLITE POSITIONING MODULE AND SATELLITE POSITIONING METHOD

CROSS-REFERENCE TO RELATED APPLICATIONS

This application claims priority to Taiwanese Application Serial No. 107145518, filed on Dec. 17, 2018. The entirety of the above-mentioned patent application is hereby incorporated by reference herein and made a part of this specification.

BACKGROUND

1. Technical Field

The present disclosure relates to positioning systems, and, more particularly, to a satellite positioning module and a satellite positioning method.

2. Description of the Prior Art

With the rapid development of self-piloting techniques, the positioning requirement of high precision is demanding. However, the precision of satellite positioning is affected by a variety of interfering factors, such as the satellite track error, clock error, ionospheric error, troposphere error, and multipath error between the satellites and the ground receivers. The common mode errors, including the satellite track error, the clock error, the ionospheric error and the troposphere error, can be eliminated by a calibration technique of a differential positioning system. However, the positioning error caused by the multipath cannot be improved by the differential position method, since the reference station and the moving station are located at different places and are affected by different multipaths. Moreover, obstruction objects in cities, such as buildings and trees, will generate a shadowing effect on satellite signals. As a result, when a car is travelling in the cities, signal outage inevitably occurs during a differential operation process of carrier phase measurement value, and the time of float is prolonged before the signals are resumed completely and the precise cycle fixed is obtained again, which results in quality degradation of satellite signals and delaying of positioning operation.

To address the error problem caused by the multipath or shadowing effect, the quality of the satellite signals is selected before the receiver performs a positioning algorithm, in order to improve the result, increase the ratio of cycle fixed, and improve the precision and speed of positioning satellites. For instance, a selecting threshold is set for an elevation angle (El) or a signal-to-noise-ratio (SNR) to filter satellites. In specific, satellites that have elevation angles lower than a cutoff elevation angle (e.g., 15°) will be eliminated, to prevent them from participating the positioning algorithm. Since satellites that have lower elevation angles are likely to be affected by multipath, such the method can at least improve the multipath error. Similarly, satellites that have SNRs lower than a predefined SNR (e.g., 35 dB) will be eliminated or be given lower weights in the positioning algorithm. Such the method can still inhibit the multipath effect.

However, the above two methods select satellites by using a fixed elevation angle or a fixed signal-to-noise-ratio as a selecting criteria, and cannot adapt to the varying environment where a car is travelling and adjust the satellite signals accordingly. Therefore, as the car travels within an area where a lot of obstacles stand (e.g., downtown), the loosened selecting criteria may not eliminate the satellites that have signals of bad quality, so that the positioning efficacy is affected. On the contrast, as the car travels within a spacious area (e.g., suburban), the strict selecting criteria may eliminate the satellites that have signals of good enough quality. As a result, the number of satellites that participate the positioning algorithm is very small, and the resulting precision is compromised. If the car cannot be positioned precisely and quickly to meet the varying environment, the future self-piloting application will have safety concern.

Therefore, how to adjust the satellite selecting criteria based on the environment variation to increase the fixed ratio and improve the positioning precision to attain the lane grade is becoming an urgent issue in the art.

SUMMARY

In an exemplary embodiment, a satellite positioning module according to the present disclosure comprises: a receiver configured for receiving satellite signals from a plurality of satellites; and a processor connected to the receiver and configured for: performing an operation based on the satellite signals to obtain an elevation angle standard deviation; performing an operation based on the elevation angle standard deviation to obtain an elevation angle mask value; selecting a satellite signal of a satellite that has an elevation angle greater than the elevation angle mask value based on the satellite signals for performing a positioning algorithm; and performing the positioning algorithm to obtain position information.

In another exemplary embodiment, a satellite positioning method according to the present disclosure comprises: receiving satellite signals from a plurality of satellites; performing an operation based on the satellite signals to obtain an elevation angle standard deviation; performing an operation based on the elevation angle standard deviation to obtain an elevation angle mask value; selecting satellite signals of a satellite that has an elevation angle greater than the elevation angle mask value based on the satellite signals for performing a positioning algorithm; and performing the positioning algorithm to obtain position information.

It is known from the above that a satellite positioning module and a satellite positioning method according to the present disclosure take an elevation angle and a signal-to-noise-ratio standard deviation into the computation of selecting criteria of an elevation angle and a signal-to-noise-ratio, take environment factors where a vehicle stays into the criteria of satellite selection, and select a satellite that is in the most compliance with the current environment and has better signal quality to perform a positioning algorithm, to achieve fast positioning efficacy of high quality and solve the problem of the prior art, which cannot adapt to the changing of the environment in real-time and affect the positioning of a vehicle.

DETAILED DESCRIPTION

The following illustrative exemplary embodiments are provided to illustrate the disclosure of the present disclosure, these and other advantages and effects can be apparently understood by those in the art after reading the disclosure of this specification. The present disclosure can also be performed or applied by other different embodiments. The details of the specification may be on the basis of different points and applications, and numerous modifications and variations can be devised without departing from the spirit of the present disclosure.

Figure 1:
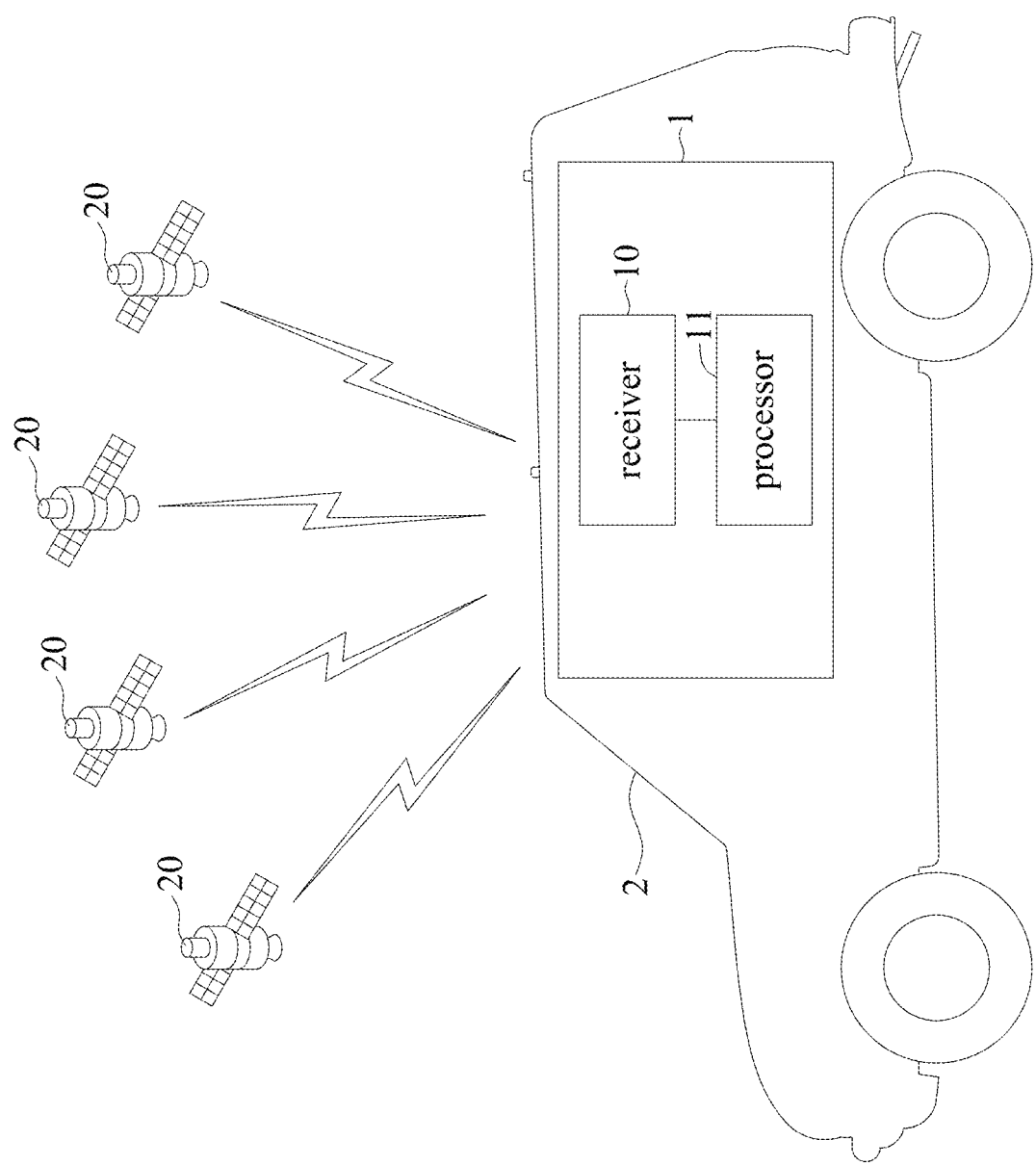
FIG. 1 is a functional block diagram of a satellite positioning module according to the present disclosure.

Please refer to FIG. 1, which is a functional block diagram of a satellite positioning module 1 according to the present disclosure.

The satellite positioning module 1 comprises a receiver 10 and a processor 11. The receiver 10 is configured for receiving satellite signals from a plurality of satellites 20. The processor 11 is connected to the receiver 10, and configured for: performing an operation based on the satellite signals to obtain an elevation angle standard deviation, performing an operation based on the elevation angle standard deviation to obtain an elevation angle mask value, selecting a satellite signal of a satellite that has an elevation angle greater than the elevation angle mask value based on the satellite signals of the satellites to perform a positioning algorithm, and performing a positioning operation based on the positioning algorithm to obtain position information (e.g., longitude and latitude data or XYZ axis data). The satellite positioning module 1 according to the present disclosure can be applied to a vehicle 2, such as a car.

Please refer to Table 1 at the same time, which illustrates the satellite positioning module 1 of an exemplary embodiment according to the present disclosure selecting a satellite.

by $SNR_{max}$), respectively, as quality evaluation criteria. In Table 1, the satellite No. 4 has the maximum elevation angle so that $El_{max}$ is equal to 60, and the satellite No. 6 has the maximum signal-to-noise-ratio so that $SNR_{max}$ is 42 dB.

The processor 11 compares the elevation angles $El_n$ and the signal-to-noise-ratios $SNR_n$ of the remaining satellites with $El_{max}$ and $SNR_{max}$, respectively, to calculate an elevation angle quality factor $El_n/El_{max}$ and a signal-to-noise-ratio quality factor $SNR_n/SNR_{max}$ of each of the satellites and evaluate the quality index fn of each of the satellite signals based on the following equation.

$$f_n = \frac{El_n}{El_{max}} + \frac{SNR_n}{SNR_{max}}$$

Based on the calculating result of the quality index fn of each of the satellites, the processor 11 finds out that it is the satellite No. 2 that has the lowest fn value, so El1 is taken as the initial elevation angle mask value $El_{ini}$ and $SNR_2$ is taken as the initial signal-to-noise-ratio mask value $SNR_{ini}$. Accordingly, the initial elevation angle mask value $El_{ini}$ is 14, and the initial signal-to-noise-ratio mask value $SNR_{ini}$ is 25.

The processor 11 calculates an elevation angle standard deviation Else and signal-to-noise-ratio standard deviation $SNR_{SD}$ used for selecting a satellite based on the following equations, wherein the Mean(El) and Mean(SNR) represent the average of the elevation angles and the signal-to-noise-ratios of the eight satellites, respectively (for instance, in Table 1 the Mean(El) is 41.125 and the Mean(SNR) is 35.625).

$$El_{SD} = \sqrt{\frac{1}{N}\sum_{n=1}^{N}(El_n - \text{Mean}(El))^2}$$

TABLE 1

| No. | Eln | SNRn | Eln/Elmax | SNRn/SNRmax | fn | Var_Eln | Var_SNRn |
|---|---|---|---|---|---|---|---|
| 1 | 30 | 37 | 0.5 | 0.880952381 | 1.380952 | 225 | 0.020408 |
| 2 | 14 | 25 | 0.233333 | 0.595238095 | 0.828571 | 961 | 147.449 |
| 3 | 50 | 38 | 0.833333 | 0.904761905 | 1.738095 | 25 | 0.734694 |
| 4 | 60 | 41 | 1 | 0.976190476 | 1.97619 | 225 | 14.87755 |
| 5 | 55 | 40 | 0.916667 | 0.952380952 | 1.869048 | 100 | 8.163265 |
| 6 | 58 | 42 | 0.966667 | 1 | 1.966667 | 169 | 23.59184 |
| 7 | 44 | 33 | 0.733333 | 0.785714286 | 1.519048 | 1 | 17.16327 |
| 8 | 18 | 29 | 0.3 | 0.69047619 | 0.990476 | 729 | 66.30612 |

Table 1 is taken as an example. The receiver 10 of the satellite positioning module 1 receives satellite signals of a total of eight satellites 20 (No. 1 to No. 8) in the beginning, and transmits the satellite signals to the processor 11. The satellite signals of the satellite No. n comprise at least an elevation angle $El_n$ and a signal-to-noise-ratio $SNR_n$ of the satellite No. 5. For instance, in Table 1 an elevation angle $El_n$ of the satellite No. 3 is 50 degrees, and a signal-to-noise-ratio $SNR_5$ is 40 dB.

The processor 11, after receiving the satellite signals of the eight satellites No. 1 to No. 8, calculates a quality index fn corresponding to each of the satellite signals. The quality index fn is used for evaluating the quality of an elevation angle and a signal-to-noise-ratio of each of the satellites. In practice, the processor 11 searches the eight satellites for two satellites that have a maximum elevation angle (represented by $El_{max}$) and a maximum signal-to-noise-ratio (represented -continued $$SNR_{SD} = \sqrt{\frac{1}{N}\sum_{n=1}^{N}(SNR_n - \text{Mean}(SNR))^2}$$

Based on the calculating result, the elevation angle standard deviation $El_{SD}$ is 17.4463 and the signal-to-noise-ratio standard deviation $SNR_{SD}$ is 5.89816, which represent the variation extents of the elevation angles and the signal-to-noise-ratios of the eight satellites, respectively. In an exemplary embodiment, the values of the $El_{SD}$ and the $SNR_{SD}$ vary with the variation of the environment where a vehicle is traveling.

The processor 11 adds the initial elevation angle mask value $El_{ini}$ by the elevation angle standard deviation $El_{SD}$ to calculate an elevation angle mask value $El_{mask}$, and adds the initial signal-to-noise-ratio mask value $SNR_{ini}$ by the signalto-noise-ratio standard deviation $SNR_{SD}$ to calculate a signal-to-noise-ratio mask value $SNR_{mask}$. Table 1 is taken as an example. After calculation, the elevation angle mask value $El_{mask}$ is 31.4463 degrees, and the signal-to-noise-ratio mask value $SNR_{mask}$ is 30.89816 dB. As described previously, since the standard deviation of the elevation angle or the signal-to-noise-ratio varies with the variation of the environment, the present disclosure selects the satellites based on the elevation angle mask value $El_{mask}$ and/or the signal-to-noise-ratio mask value $SNR_{mask}$, and performs a positioning algorithm with the data recorded by the selected satellite signals.

In an exemplary embodiment according to the present disclosure, a satellite that has a higher elevation angle can be selected based on the elevation angle mask value $El_{mask}$ only, to participate the positioning algorithm. In another exemplary embodiment, a satellite that has a higher signal-to-noise-ratio can also be selected based on the signal-to-noise-ratio mask value $SNR_{mask}$ only, to performing a positioning operation. In yet another exemplary embodiment according to the present disclosure, the elevation angle mask value $El_{mask}$ and the signal-to-noise-ratio mask value $SNR_{mask}$ can be combined to select a satellite that has an elevation angle and a signal-to-noise-ratio that are both better, to perform a positioning operation. For instance, if $El_{mask}$ that is 31.4463 degrees and the signal-to-noise-ratio mask value $SNR_{mask}$ that is 30.89816 dB are taken as the selecting criteria, the satellites No. 1, No. 2 and No. 8 will be omitted, and, in the end, the processor 11 will employ the satellite signals of the satellites No. 3 to No. 7 to perform a subsequent positioning algorithm.

When the shadow or multi-path effect of an environment where a vehicle stays affects more significantly, the elevation angle standard deviation $El_{SD}$ and the signal-to-noise-ratio standard deviation $SNR_{SD}$ of the satellite signals become greater accordingly, which, as a result, causes the elevation angle mask value $El_{mask}$ and the signal-to-noise-ratio mask value $SNR_{mask}$ too great for the number of the selected satellites cannot meet the executable condition of the positioning algorithm. For instance, when a number of satellites that perform the positioning algorithm is minimum and when a vehicle is traveling to downtown where the buildings are taller and denser so that the satellite signals have less strength and fluctuate more greatly, in order to ensure that the vehicle can keep the basic positioning function, the processor 11 will loosen the selecting criteria temporarily to allow a number of satellites that participate the positioning algorithm to meet the least need number and meet the executable condition of the positioning algorithm. For instance, in a Global Positioning System (GPS) a receiving end needs at least four satellite signals in order to perform a positioning algorithm. However, as the number of satellites are insufficient, the positioning parameters (including 3D space coordinates and time parameters) cannot be calculated, so that the position information of the vehicle, such as longitude and latitude data or XYZ axis data, cannot be obtained by the positioning algorithm. Therefore, the processor 11 will loosen the elevation angle mask value $El_{mask}$ and the signal-to-noise-ratio mask value $SNR_{mask}$ temporarily to meet the executable condition of the positioning algorithm. For instance, the calculation of the elevation angle mask value $El_{mask}$ and the signal-to-noise-ratio mask value $SNR_{mask}$ is not based on the elevation angle standard deviation $El_{SD}$ and the signal-to-noise-ratio standard deviation $SNR_{SD}$ temporarily, but is performed by taking the initial elevation angle mask value Elm, and the initial signal-to-noise-ratio mask value $SNR_{ini}$ as the elevation angle mask value $El_{mask}$ and signal-to-noise-ratio mask value $SNR_{mask}$, respectively, to increase the number of satellites that participate the positioning temporarily. Alternatively, upper thresholds can be defined for the elevation angle standard deviation $El_{SD}$ and the signal-to-noise-ratio standard deviation $SNR_{SD}$. When the processor 11 determines that the $El_{SD}$ and $SNR_{SD}$ greater than or equal to their own upper thresholds, the initial mask values $El_{ini}$ and $SNR_{ini}$ are taken as the $El_{mask}$ and the $SNR_{mask}$, respectively, to select a satellite. The processor 11 may follow the above methods to loosen the selecting criteria to meet the executable condition of the positioning algorithm (e.g., at least four satellite have to be selected for the vehicle to be positioned), until the vehicle travels to another environment where the elevation angle standard deviation $El_{SD}$ and the signal-to-noise-ratio standard deviation $SNR_{SD}$ of the satellite signals become smaller again, and then the elevation angle standard deviation $El_{SD}$ and the signal-to-noise-ratio standard deviation $SNR_{SD}$ will be taken into the calculation of the elevation angle mask value $El_{mask}$ and the signal-to-noise-ratio mask value $SNR_{mask}$ to resume the original selecting method. However, since the satellite positioning module 1 according to the present disclosure can be applied to a variety of Global Navigation Satellite System (GNSS), such as the GLONASS System developed by Russia, the Galileo System developed by E.U. the BeiDou System developed by China, or any other positioning system extending from the above positioning systems, the above exemplary embodiment employs four satellite for illustration. As the position system changes and the number of satellites needed to perform the positioning operation changes, e.g., at least five satellites, the satellite positioning module 1 according to the present disclosure can still be applied to such the position system. Therefore, the present disclosure is not limited by the aforementioned exemplary embodiments.

Figure 2:
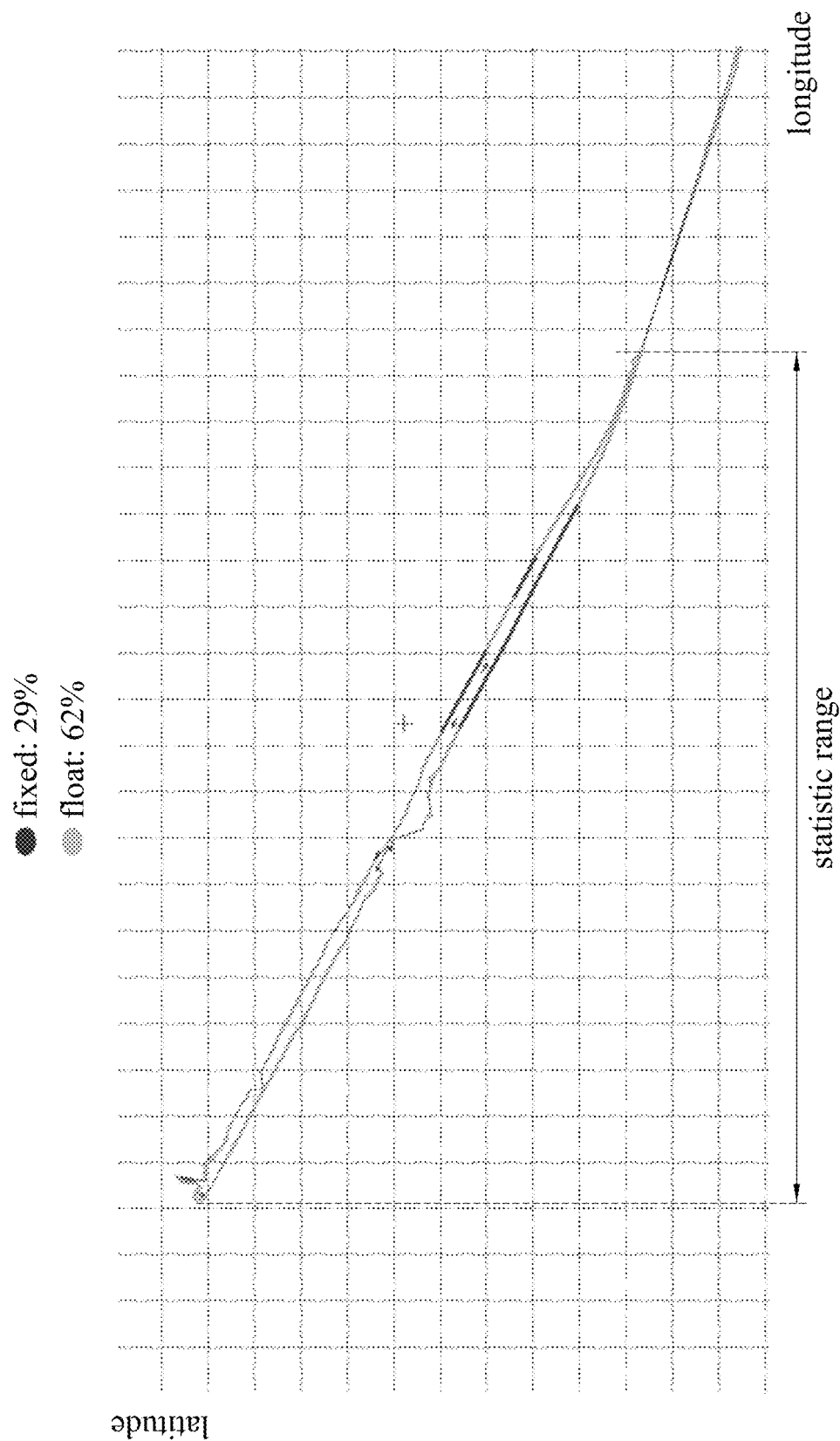
FIG. 2 is a positioning track measured by a positioning method according to the prior art.
Figure 3:
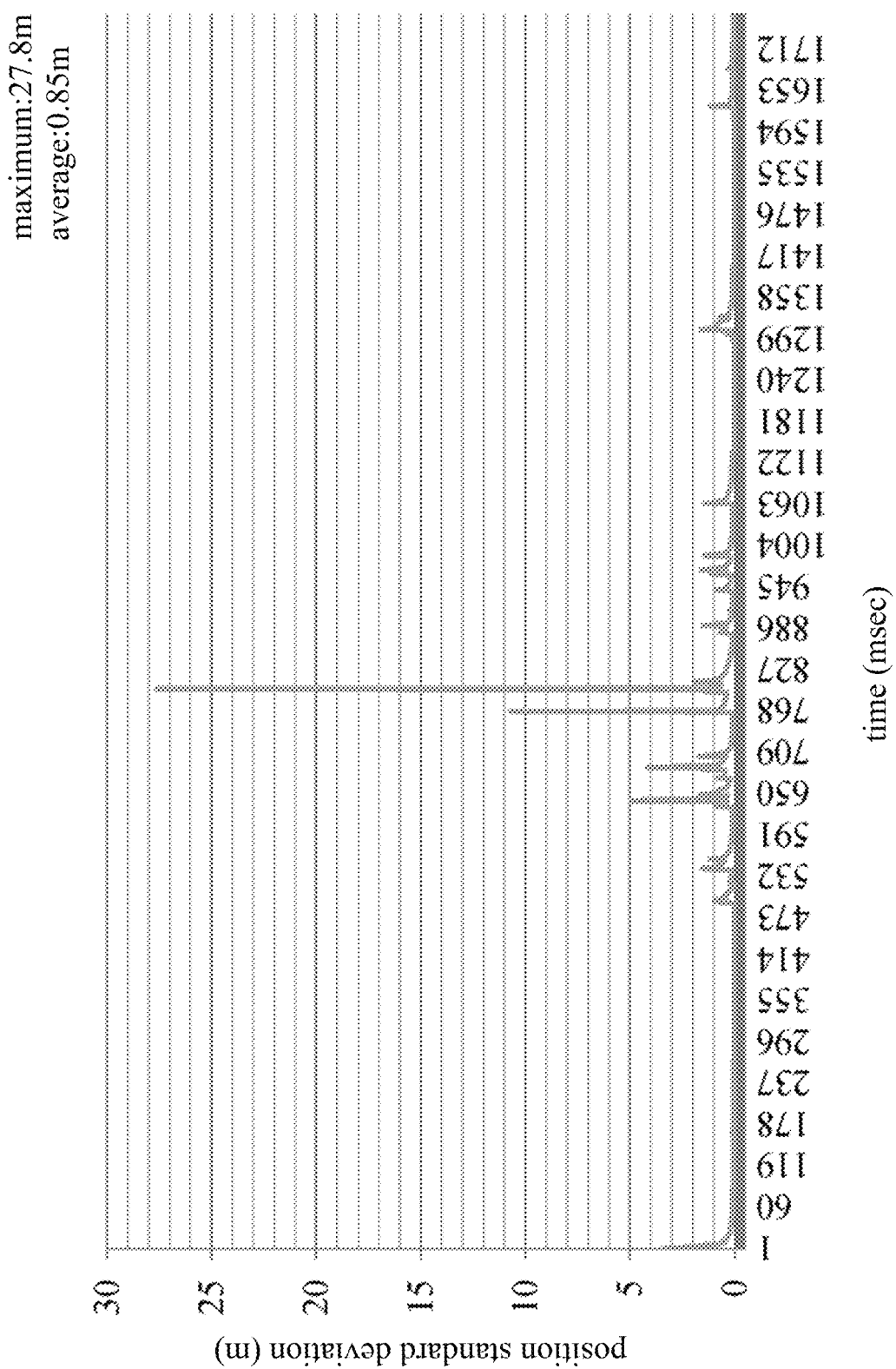
FIG. 3 is a position standard deviation corresponding to the positioning track of FIG. 2.

Please refer to FIGS. 2 and 3. FIG. 2 is a positioning track measured by a positioning method according to the prior art. FIG. 3 is a positioning standard deviation corresponding to the positioning track of FIG. 2.

As shown in FIGS. 2 and 3, general setting parameters according to the current art are used, i.e., the elevation angle mask value being fixed to 15 degrees, the signal-to-noise-ratio mask value being fixed to 35 dB, and a Real Time Kinematic (RTK) being used to test a positioning track and a positioning standard deviation of a car travelling a round trip through an underground channel, a highway and downtown one time (corresponding to all travelling tracks from the right side to the left side and then from the left side to the right side of FIG. 2). As shown in FIG. 2, within a statistic range, it can be seen that the positioning signal state of a car travelling out of the underground channel is float, and is turned to be fixed after a period of time (i.e., receiving the precise cycle N value). In the current art, it takes 9-12 seconds to change float to fixed. In FIG. 2, x-axis is longitude, y-axis is latitude, and a track constituted by the longitude and the latitude is the current position of a car. Within an entire statistic range that a vehicle travels a round trip one time, fixed time occupies 29%, and float time occupies 62%. As shown in FIG. 3, a positon standard deviation can be as great as 27.8 m, and has an average of 0.85 m.

Figure 4:
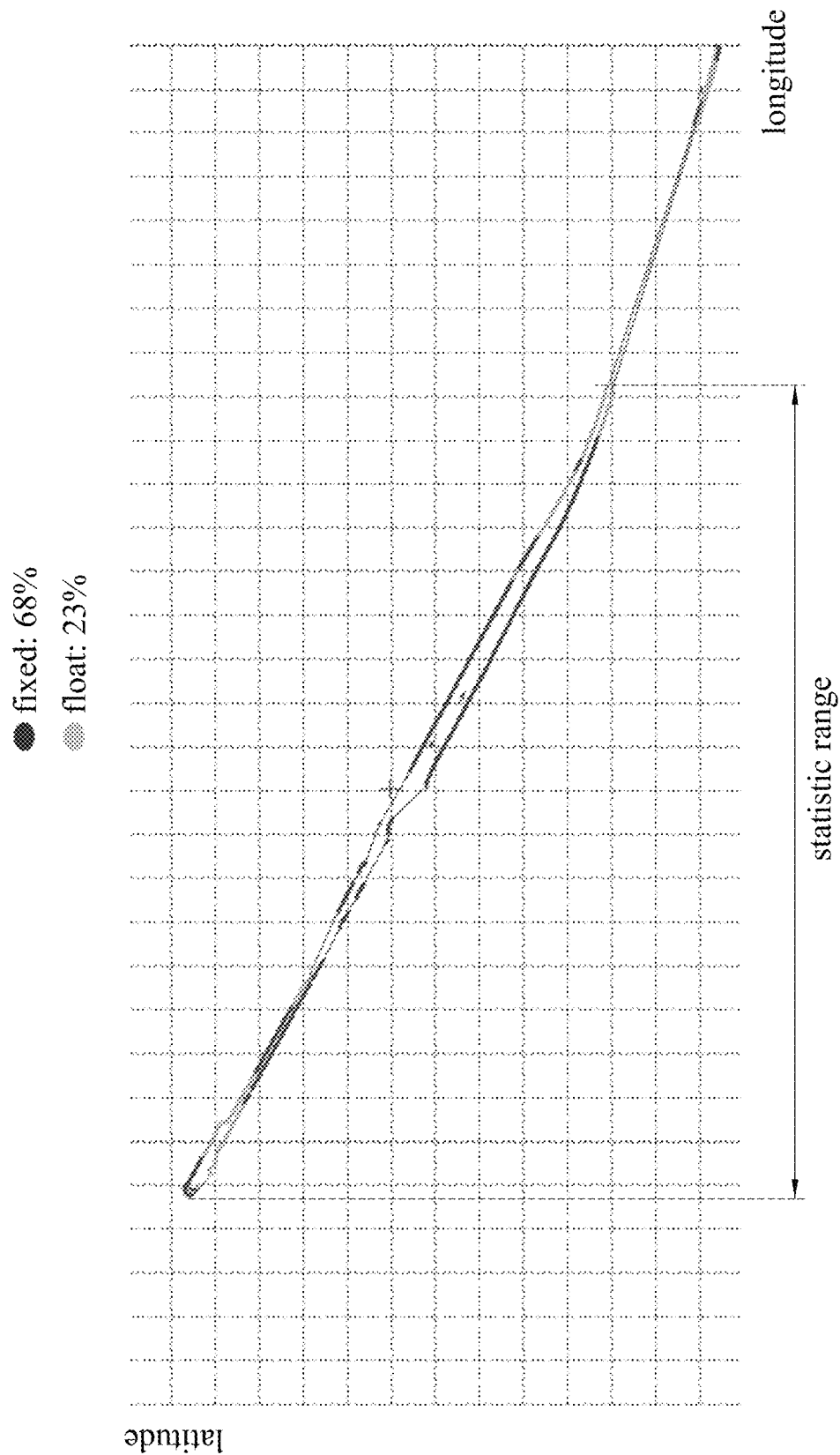
FIG. 4 is a positioning track measured by a satellite positioning module according to the present disclosure.
Figure 5:
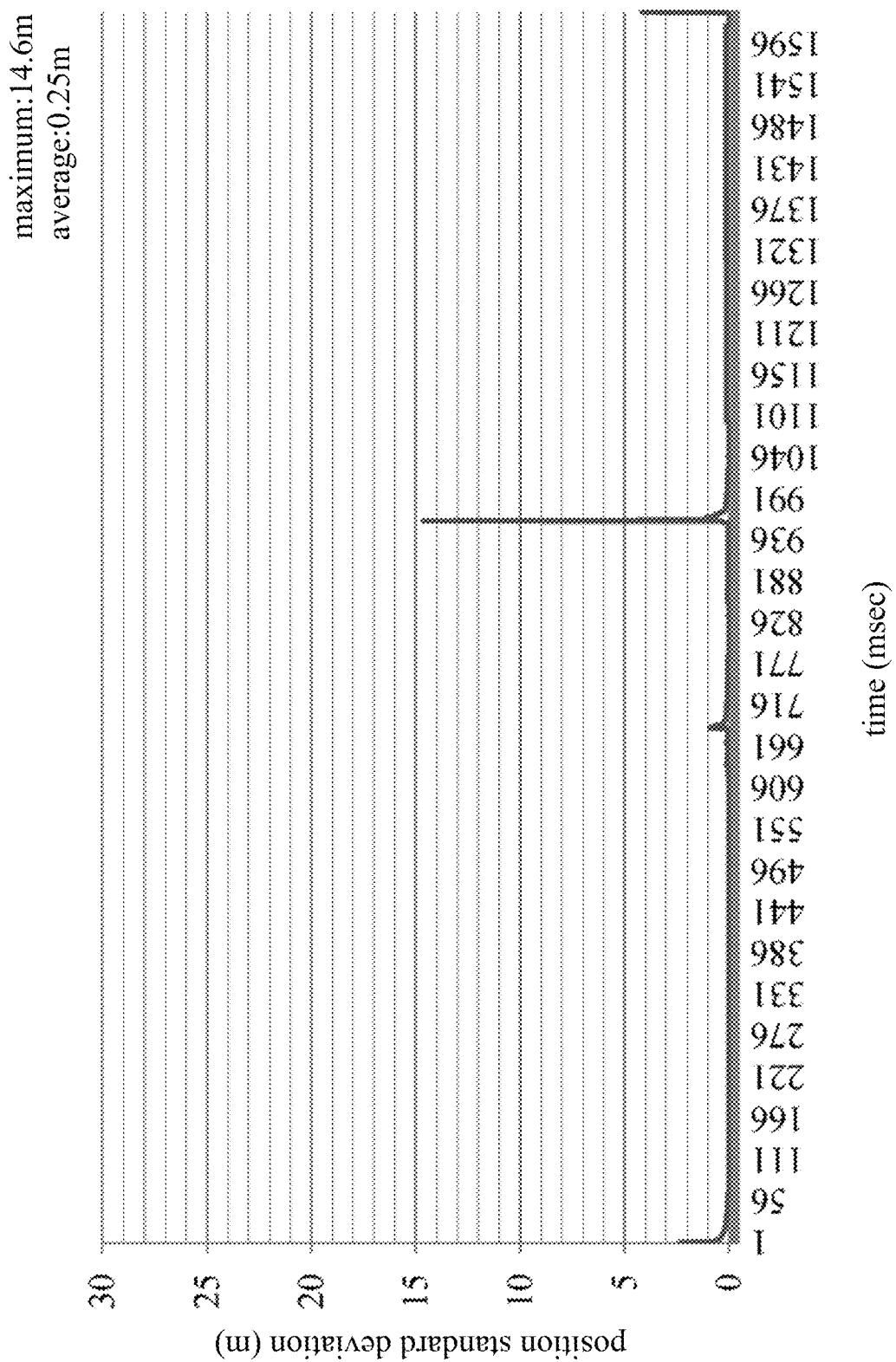
FIG. 5 is a position standard deviation corresponding to the positioning track of FIG. 4.

Please refer to FIGS. 4 and 5. FIG. 4 is a positioning track measured by the satellite positioning module 1 according to the present disclosure. FIG. 5 is a positioning standard deviation corresponding to the positioning track of FIG. 4.

FIGS. 4 and 5 show and compare the results of employing RTK positioning in the same environment in the same time.

FIGS. 4 and 5 apply the satellite positioning module 1 according to the present disclosure to the raw data measured in FIGS. 2 and 3. As shown in FIG. 4, after the satellite positioning module 1 according to the present disclosure is applied the ratio of time occupied by fixed increases to 68% and a ratio of float decreases to 23%, wherein the increase of the ratio of fixed indicates that the chance that the cycle N value is solved increases and the chance to jump to float decreases. Therefore, it can be definitely seen that the positioning technique according to the present disclosure can adapt to the variation of environment and selects and positions a satellite that has better signal quality currently, and the time for positioning the better signal becomes longer. It can also be seen from FIG. 5 that the positon standard deviation is smaller than that shown in FIG. 3, and has a maximum of only 14.6 m and an average of 0.25 m.

It should be noted that the present disclosure is not only applied to the RTK relative positioning method disclosed in the above exemplary embodiment, but also applied to a single point positioning of a precise point positioning (PPP) technique or other positioning techniques. As the present disclosure is combined with the RTK or PPP positioning technique, the positioning precision can be further increased to the centimeter scale.

Figure 6:
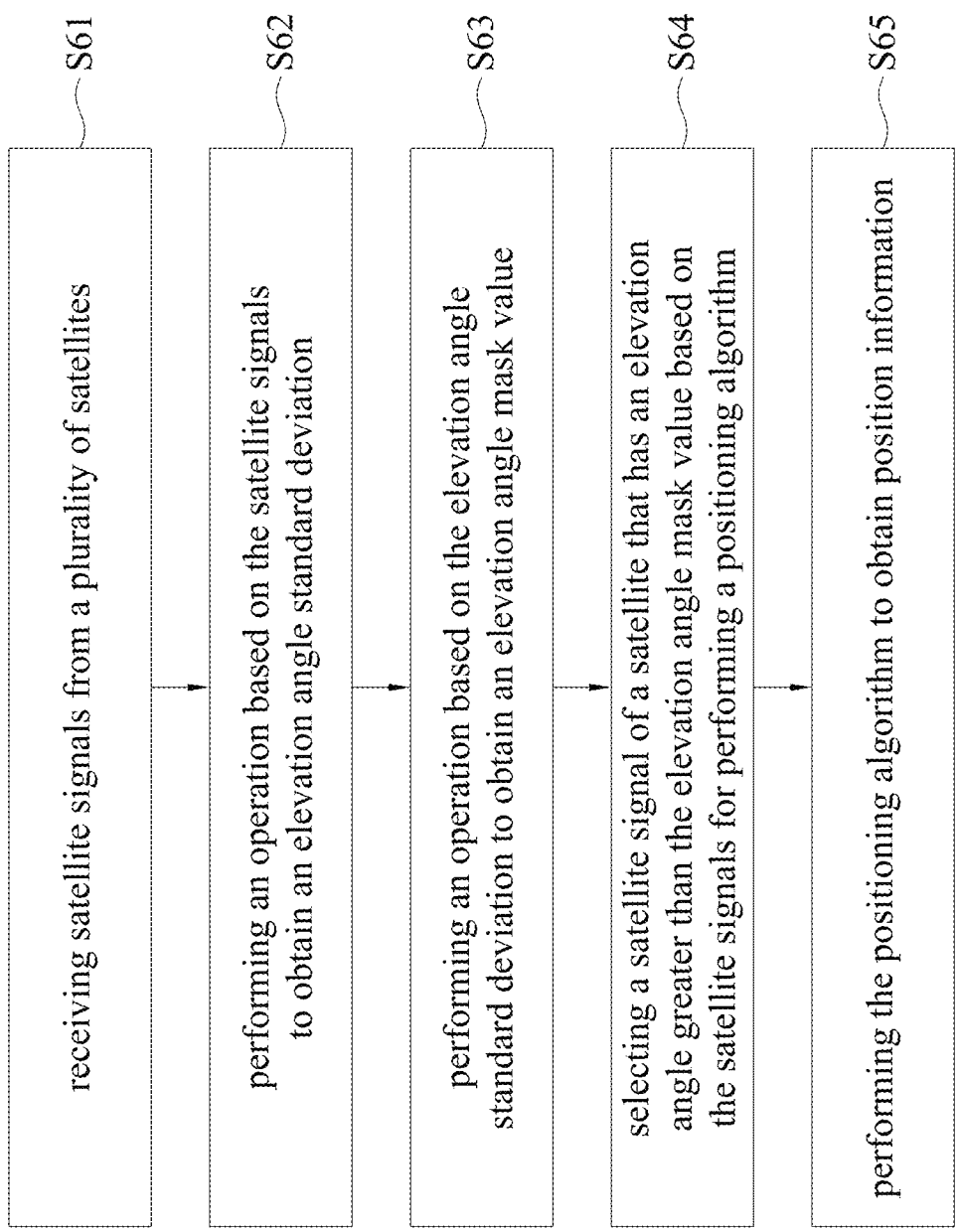
FIG. 6 is a flow chart of a satellite positioning method according to the present disclosure.

Please further refer to FIG. 6, which is a satellite positioning method performed through the satellite positioning module 1 according to the present disclosure, including: receiving, by the receiver 10, satellite signals from a plurality of satellites 20 (step S61); performing, by the processor 11, an operation based on the satellite signals to obtain an elevation angle standard deviation $El_{SD}$ (step S62); performing an operation based on the elevation angle standard deviation $El_{SD}$ to obtain an elevation angle mask value $El_{mask}$ (step S63); selecting satellite signal of a satellite that has an elevation angle greater than the elevation angle mask value based on the satellite signals of the satellites to perform a positioning algorithm (step S64); and performing, by the positioning algorithm, to obtain position information of a car (step S65).

In sum, a satellite positioning module and a satellite positioning method according to the present disclosure take an elevation angle and a signal-to-noise-ratio standard deviation into the calculation of the selecting conditions of an elevation angle and a signal-to-noise-ratio, respectively to take the environment factors where a car stays into the criteria of satellite selection, to select a satellite that complies with the current environment and has better signal quality to perform a positioning algorithm, thereby achieving the fast positioning efficacy of high quality and solving the problem of the prior art that cannot reflect the environment variation in real time and the car positioning is thus affected.

The foregoing descriptions of the exemplary embodiments are only illustrated to disclose the features and functions of the present disclosure and not restrictive of the scope of the present disclosure. It should be understood to those in the art that all modifications and variations according to the spirit and principle in the disclosure of the present disclosure should fall within the scope of the appended claims.

What is claimed is:

1. A satellite positioning module, comprising:
a receiver configured to receive satellite signals from a plurality of satellites; and
a processor connected to the receiver and configured to:
perform an operation based on the satellite signals to obtain an elevation angle standard deviation;
perform an operation based on the elevation angle standard deviation to obtain an elevation angle mask value;
select a satellite signal of a satellite that has an elevation angle greater than the elevation angle mask value based on the satellite signals for performing a positioning algorithm; and
perform the positioning algorithm to obtain position information.

2. The satellite positioning module of claim 1, wherein the processor performs an operation based on the elevation angle standard deviation to obtain the elevation angle mask value by: selecting an initial elevation angle mask value based on a quality index corresponding to each of the satellites, and taking a sum of the initial elevation angle mask value and the elevation angle standard deviation as the elevation angle mask value.

3. The satellite positioning module of claim 2, wherein the processor is configured for calculating a sum of an elevation angle quality factor and a signal-to-noise-ratio quality factor of each of the satellite as the quality index of each of the satellites, wherein the elevation angle quality factor is a ratio of an elevation angle of each of the satellites to a maximum elevation angle of the elevation angles of the satellites, and the signal-to-noise-ratio quality factor is a ratio of a signal-to-noise-ratio of each of the satellites to a maximum signal-to-noise-ratio of the signal-to-noise-ratios of the satellites.

4. The satellite positioning module of claim 2, wherein the processor is further configured for determining whether a number of satellites selected based on the elevation angle mask value meets an executable condition of the positioning algorithm or not, and selecting a satellite using the elevation angle mask value when the number of the selected satellites meets the executable condition of the positioning algorithm, and selecting a satellite using the initial elevation angle mask value when the number of the selected satellites does not meet the executable condition of the positioning algorithm.

5. The satellite positioning module of claim 2, wherein the processor is further configured for performing an operation on the elevation angle standard deviation based on an upper threshold, and selecting a satellite based on the initial elevation angle mask value when the elevation angle standard deviation greater than or equal to the upper threshold.

6. The satellite positioning module of claim 1, wherein the processor is further configured for:
performing an operation based on the satellite signals to obtain a signal-to-noise-ratio standard deviation;
performing an operation based on the signal-to-noise-ratio standard deviation to obtain a signal-to-noise-ratio mask value;
selecting satellite signal of a satellite that has an elevation angle greater than the elevation angle mask value and a signal-to-noise-ratio greater than the signal-to-noise-ratio mask value based on the satellite signals of the satellites to perform the positioning algorithm.

7. The satellite positioning module of claim 6, wherein the processor is configured for selecting an initial signal-to-noise-ratio mask value based on a quality index corresponding to each of the satellite, and taking a sum of the initial signal-to-noise-ratio mask value and the signal-to-noise-ratio standard deviation as the signal-to-noise-ratio mask value.

8. The satellite positioning module of claim 7, wherein the processor is further configured for determining whether a number of satellites selected based on the signal-to-noise-ratio mask value meets an executable condition of the positioning algorithm or not, and selecting a satellite with the signal-to-noise-ratio mask value when the number of the selected satellites meets the executable condition of the positioning algorithm, and selecting a satellite with the initial signal-to-noise-ratio mask value when the number of the selected satellites does not meet the executable condition of the positioning algorithm.

9. The satellite positioning module of claim 7, wherein the processor is further configured for performing an operation on the signal-to-noise-ratio standard deviation based on an upper threshold, and selecting a satellite using the initial signal-to-noise-ratio mask value when the signal-to-noise-ratio standard deviation greater than or equal to the upper threshold.

10. The satellite positioning module of claim 7, wherein the processor is configured for calculating a sum of an elevation angle quality factor and a signal-to-noise-ratio quality factor of each of the satellites as the quality index of each of the satellites, wherein the elevation angle quality factor is a ratio of an elevation angle of each of the satellites to a maximum elevation angle of the elevation angles of the satellites, and the signal-to-noise-ratio quality factor is a ratio of a signal-to-noise-ratio of each of the satellites to a maximum signal-to-noise-ratio of the signal-to-noise-ratios of the satellites.

11. A satellite positioning method, comprising:
receiving satellite signals from a plurality of satellites;
performing an operation based on the satellite signals to obtain an elevation angle standard deviation;
performing an operation based on the elevation angle standard deviation to obtain an elevation angle mask value;
selecting satellite signals of a satellite that has an elevation angle greater than the elevation angle mask value based on the satellite signals for performing a positioning algorithm; and
performing the positioning algorithm to obtain position information.

12. The satellite positioning method of claim 11, wherein performing an operation based on the elevation angle standard deviation to obtain the elevation angle mask value comprises: selecting an initial elevation angle mask value based on a quality index corresponding to each of the satellites, and taking a sum of the initial elevation angle mask value and the elevation angle standard deviation as the elevation angle mask value.

13. The satellite positioning method of claim 12, further comprising determining whether a number of satellites selected based on the elevation angle mask value meets an executable condition of the positioning algorithm or not, and selecting a satellite using the elevation angle mask value when the number of the selected satellites meets the executable condition of the positioning algorithm, and selecting a satellite using the initial elevation angle mask value when the number of the selected satellites does not meet the executable condition of the positioning algorithm.

14. The satellite positioning method of claim 12, further comprising performing an operation on the elevation angle standard deviation based on an upper threshold, and selecting a satellite based on the initial elevation angle mask value when the elevation angle standard deviation greater than or equal to the upper threshold.

15. The satellite positioning method of claim 11, further comprising:
performing an operation based on the satellite signals to obtain a signal-to-noise-ratio standard deviation;
performing an operation based on the signal-to-noise-ratio standard deviation to obtain a signal-to-noise-ratio mask value;
selecting satellite signal of a satellite that has an elevation angle greater than the elevation angle mask value and a signal-to-noise-ratio greater than the signal-to-noise-ratio mask value based on the satellite signals of the satellites to perform the positioning algorithm; and
performing the positioning algorithm to obtain position information.

16. The satellite positioning method of claim 15, further comprising: selecting an initial signal-to-noise-ratio mask value based on a quality index corresponding to each of the satellites, and taking a sum of the initial signal-to-noise-ratio mask value and the signal-to-noise-ratio standard deviation as the signal-to-noise-ratio mask value.

17. The satellite positioning method of claim 16, further comprising determining whether a number of satellites selected based on the signal-to-noise-ratio mask value meets an executable condition of the positioning algorithm or not, and selecting a satellite with the signal-to-noise-ratio mask value when the number of the selected satellites meets the executable condition of the positioning algorithm, and selecting a satellite with the initial signal-to-noise-ratio mask value when the number of the selected satellites does not meet the executable condition of the positioning algorithm.

18. The satellite positioning method of claim 16, further comprising performing an operation on the signal-to-noise-ratio standard deviation based on an upper threshold, and selecting a satellite using the initial signal-to-noise-ratio mask value when the signal-to-noise-ratio standard deviation greater than or equal to the upper threshold.

19. The satellite positioning method of claim 16, wherein a sum of an elevation angle quality factor and a signal-to-noise-ratio quality factor of each of the satellites is taken as the quality index of each of the satellites, the elevation angle quality factor is a ratio of an elevation angle of each of the satellites to a maximum elevation angle of the elevation angles of the satellites, and the signal-to-noise-ratio quality factor is a ratio of a signal-to-noise-ratio of each of the satellites to a maximum signal-to-noise-ratio of the signal-to-noise-ratios of the satellites.

* * * * *